(12) United States Patent
Buettner (10) Patent No.: US 8,977,445 B2
(45) Date of Patent: Mar. 10, 2015

(54) SYSTEM AND METHOD FOR DIG DETECTION

(71) Applicant: Caterpillar Inc., Peoria, IL (US)

(72) Inventor: Jeffrey E. Buettner, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/920,116

(22) Filed: Jun. 18, 2013

(65) Prior Publication Data

US 2014/0371994 A1 Dec. 18, 2014

(51) Int. Cl.
*G01B 5/00* (2006.01)
*E02F 9/26* (2006.01)

(52) U.S. Cl.
CPC ........................................ *E02F 9/26* (2013.01)
USPC ............. 701/50; 702/150; 702/151; 702/173; 702/174; 702/175; 702/176

(58) Field of Classification Search
CPC .................................................... E02F 9/2025
See application file for complete search history.

(56) References Cited

U.S. PATENT DOCUMENTS

| | | | | |
|---|---|---|---|---|
| 4,995,468 A * | 2/1991 | Fukuda | ......................... | 177/139 |
| 5,067,572 A * | 11/1991 | Kyrtsos et al. | ................ | 177/139 |
| 5,070,953 A * | 12/1991 | Kyrtsos et al. | ............. | 177/25.14 |
| 5,082,071 A * | 1/1992 | Kyrtsos et al. | ............. | 177/25.14 |
| 5,105,895 A | 4/1992 | Kyrtsos | | |
| 5,105,896 A * | 4/1992 | Kyrtsos | ......................... | 177/139 |
| 5,182,712 A | 1/1993 | Kyrtsos et al. | | |
| 5,509,293 A * | 4/1996 | Karumanchi | ................... | 73/1.13 |
| 5,824,965 A * | 10/1998 | Fujii et al. | ...................... | 177/136 |
| 5,941,921 A * | 8/1999 | Dasys et al. | ..................... | 701/50 |
| 6,086,509 A * | 7/2000 | Johnson et al. | ................. | 477/97 |
| 6,518,519 B1 * | 2/2003 | Crane et al. | .................... | 177/136 |
| 6,601,013 B2 * | 7/2003 | Lueschow et al. | ............ | 702/175 |
| 7,247,803 B2 * | 7/2007 | Takeda et al. | ................. | 177/137 |
| 7,627,410 B2 * | 12/2009 | Berry et al. | ..................... | 701/50 |
| 7,778,757 B2 * | 8/2010 | Brattberg | ........................ | 701/51 |
| 7,912,616 B2 * | 3/2011 | Tsukada et al. | ................. | 701/59 |
| 7,953,559 B2 * | 5/2011 | Sundermeyer et al. | ......... | 702/33 |
| 8,145,394 B2 * | 3/2012 | Chiorean et al. | ............... | 701/50 |
| 8,271,229 B2 * | 9/2012 | Hsu et al. | ...................... | 702/174 |
| 8,515,627 B2 * | 8/2013 | Marathe et al. | ................. | 701/50 |
| 8,570,183 B2 * | 10/2013 | Corrado | ........................ | 340/666 |
| 8,660,758 B2 * | 2/2014 | Janardhan et al. | .............. | 701/50 |
| 2005/0021245 A1 * | 1/2005 | Furuno et al. | .................... | 702/33 |
| 2006/0243055 A1 * | 11/2006 | Sundermeyer et al. | ......... | 73/760 |
| 2006/0243056 A1 * | 11/2006 | Sundermeyer et al. | ......... | 73/760 |
| 2006/0243180 A1 * | 11/2006 | Sundermeyer et al. | .. | 112/470.06 |

(Continued)

*Primary Examiner* — Johnathan M Dager
(74) *Attorney, Agent, or Firm* — Miller, Matthias & Hull LLP (57) ABSTRACT

A system for determining an operational state of a machine is provided. The system includes an implement position sensor configured to generate a position signal indicative of a position of an implement. The system further includes a pressure sensor configured to generate a pressure signal indicative of a pressure of a cylinder of the machine. The system also includes a controller communicably coupled to the implement position sensor and the pressure sensor. The controller is configured to receive the position signal and the pressure signal. The controller is further configured to determine a weight of a payload of the machine based on the received signals. Further, the controller is configured to determine a dig status of the machine based, at least in part, on a rate of change of the weight of the payload and the position of the implement.

20 Claims, 4 Drawing Sheets

(56) References Cited

U.S. PATENT DOCUMENTS

| | | | |
|---|---|---|---|
| 2008/0227596 A1* | 9/2008 | Schifferer | 477/52 |
| 2008/0314038 A1* | 12/2008 | Tozawa et al. | 60/414 |
| 2009/0308068 A1* | 12/2009 | Yoshino | 60/468 |
| 2010/0100338 A1* | 4/2010 | Vik et al. | 702/42 |
| 2010/0161184 A1* | 6/2010 | Marathe et al. | 701/50 |
| 2010/0250123 A1* | 9/2010 | Leman | 701/208 |
| 2012/0277961 A1* | 11/2012 | Colwell et al. | 701/50 |
| 2012/0308354 A1* | 12/2012 | Tafazoli Bilandi et al. | 414/685 |
| 2014/0019014 A1* | 1/2014 | Claxton | 701/50 |
| 2014/0039772 A1* | 2/2014 | Jensen | 701/69 |
| 2014/0129094 A1* | 5/2014 | Colwell et al. | 701/50 |
| 2014/0167971 A1* | 6/2014 | Stanley et al. | 340/666 |

* cited by examiner

SYSTEM AND METHOD FOR DIG DETECTION

TECHNICAL FIELD

The present disclosure relates to determination of an operational state of a machine having an implement, and more particularly to determination of a status associated with a dig operation being performed by the machine.

BACKGROUND

A dig operation is one of the operations which may be performed by a machine such as a wheel loader. While performing subsystem testing on the machine, an operator with very little experience may perform the dig operation in an unconventional manner. Such events may occur frequently at a customer site until the operator undergoes proper training.

Known dig detection systems generally detect performance of the dig operation through monitoring lift and tilt linkage sensors on the machine and a direction of motion of the machine. However, the known systems may be unable to detect the unconventional dig operations. This may affect identification of training deficiencies since all the dig operations may not be captured by these systems. Further, machine productivity data may also be affected. Also, these systems sometimes provide inadequate or faulty detection due to various types of material encountered by the machine.

U.S. Pat. No. 7,953,559 relates to a method and system for constructing a load history database for a structure. The method may include detecting a measurable parameter on the structure utilizing a sensor positioned on the structure and determining a value of external loads acting upon the structure based on the detected parameter. Further, the method may include evaluating the value of the external loads against a pre-established factor. Based on the evaluation, the value of the external loads are selectively stored in the load history database.

SUMMARY OF THE DISCLOSURE

In one aspect, the present disclosure provides a system for determining an operational state of a machine. The system includes an implement position sensor configured to generate a position signal indicative of a position of an implement. The system further includes a pressure sensor associated with a cylinder. The cylinder is coupled to the implement. The pressure sensor is configured to generate a pressure signal indicative of a pressure of the cylinder. The system also includes a controller communicably coupled to the implement position sensor and the pressure sensor. The controller is configured to receive the position signal and the pressure signal. The controller is further configured to determine a weight of a payload of the machine based on the received position and the pressure signal. Further, the controller is configured to determine a dig status of the machine based, at least in part, on a rate of change of the weight of the payload and the position of the implement.

In another aspect of the present disclosure, a method for determining an operational state of a machine is disclosed. The method receives a position signal indicative of a position of an implement. The method receives a pressure signal indicative of a pressure of a cylinder. The cylinder is associated with the implement. The method further determines a weight of a payload of the machine based on the received position and the pressure signal. Additionally, the method determines a dig status of the machine based, at least in part, on a rate of change of the weight of the payload and the position of the implement.

Other features and aspects of this disclosure will be apparent from the following description and the accompanying drawings.

DETAILED DESCRIPTION

Figure 1:
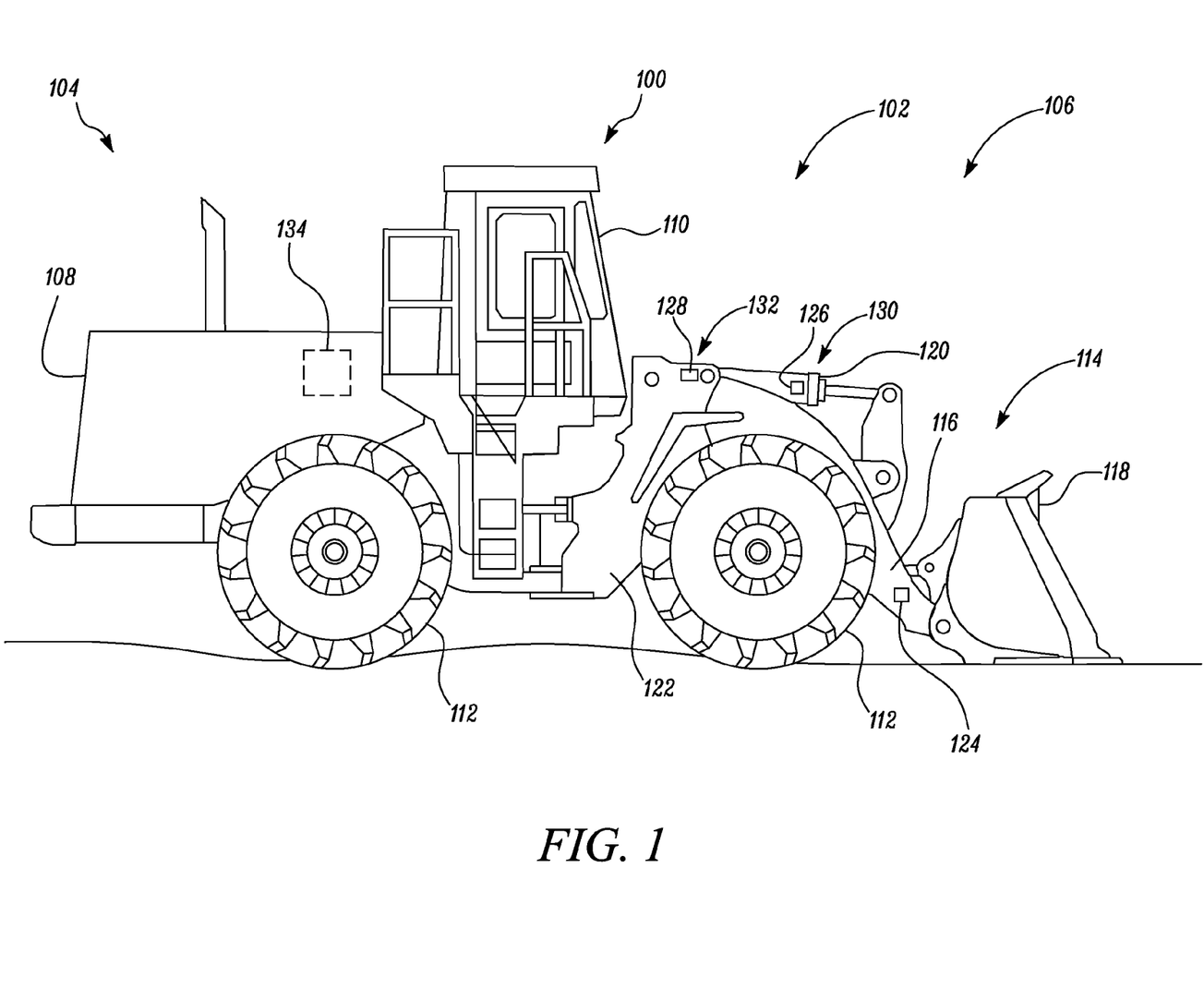
FIG. 1 is a side view of an exemplary machine, according to one embodiment of the present disclosure.

Wherever possible, the same reference numbers will be used throughout the drawings to refer to the same or the like parts. FIG. 1 shows an exemplary machine 100 that may incorporate a system for determining an operational state of the machine 100 as disclosed herein. The term "machine" used herein refers to a fixed or mobile machine that performs some type of operation associated with a particular industry, such as mining, construction, farming, etc. and operates between or within work environments (e.g. construction site, mine site, power plants, etc.). A non-limiting example of a fixed machine includes an engine system operating in a plant or off-shore environment (e.g., off-shore drilling platform). Non-limiting examples of mobile machines include commercial machines, such as trucks, cranes, earth moving vehicles, mining vehicles, backhoes, material handling equipment, farming equipment, marine vessels, aircrafts, and any type of movable machine that operates in a work environment. As shown in FIG. 1, the machine 100 is an earth moving type machine, and more particularly includes a wheel loader 102. The type of the machine 100 illustrated in FIG. 1 is exemplary and not intended to be limiting. It is contemplated that the disclosed embodiments may implement any type of machine intended to perform a task.

The machine 100 may include a rear end 104 and a front end 106. The rear end 104 may include an enclosure 108 and an operator station 110. The enclosure may include a power source, such as an engine (not shown), that may provide power to front and rear ground engaging devices 112. In one embodiment, the engine may include, for example, a diesel engine, a gasoline engine, a gaseous fuel powered engine like a natural gas engine, or any other known source of power. The power source may alternatively include a non-combustion source of power such as a fuel cell, a power storage device, an electric motor, or other similar mechanism. The front and rear ground engaging devices 112 may include wheels or track that support the machine 100.

Further, the machine 100 may include a work tool or an implement 114 to perform one or more tasks. In the given embodiment, the wheel loader 102 may be used to move payload from one place to another. The payload may include mud, rocks, construction material, asphalt or any other loading material. In the given embodiment, the wheel loader 102 may include a lift arm 116 and a bucket 118, hereinafter collectively referred to as the implement 114 of the machine 100. The implement 114 of the machine 100 is coupled to at least one cylinder 120. The cylinder 120 may be actuated hydraulically or pneumatically. The cylinder 120 is coupled to a frame 122 of the machine 100. During operation, the implement 114 is capable of movement based on the actuation of the cylinder 120. An operator of the machine 100 may operate the machine 100 and the implement 114 through controls provided in the operator station 110.

Also, during operation, the implement 114 may be in any one of several different positions. For example, in one exemplary case, the lift arm 116 may be completely extended. In another example, the lift arm 116 may be partially extended. An implement position sensor 124 may be associated with the implement 114 and may generate a position signal indicative of the position of the implement 114. In one embodiment, the implement position sensor 124 may include a rotary sensor configured to generate the position signal indicative of an angular position of the implement 114 relative to the frame 122 of the machine 100. Further, a pressure sensor may be associated with the cylinder 120 of the machine 100. In one embodiment, as shown in the accompanying figures, two pressure sensors 126, 128 may be mounted at a rod end 130 and a head end 132 of the cylinder 120 respectively. The pressure sensors 126, 128 may generate pressure signals indicative of a pressure at the respective rod and head ends 130, 132 of the cylinder 120.

The present disclosure relates to a controller 134 configured to determine the operational state of the machine 100. The controller 134 may be located on-board the machine 100. More specifically, the controller 134 may be configured to determine a dig status of the machine 100. The term "dig status" used herein refers to a status of the machine 100 associated with a dig cycle or operation. It should be noted that location of the controller 134, the implement position sensor 124 and the pressure sensors 126, 128 shown in the accompanying drawings are on an exemplary basis.

Figure 2:
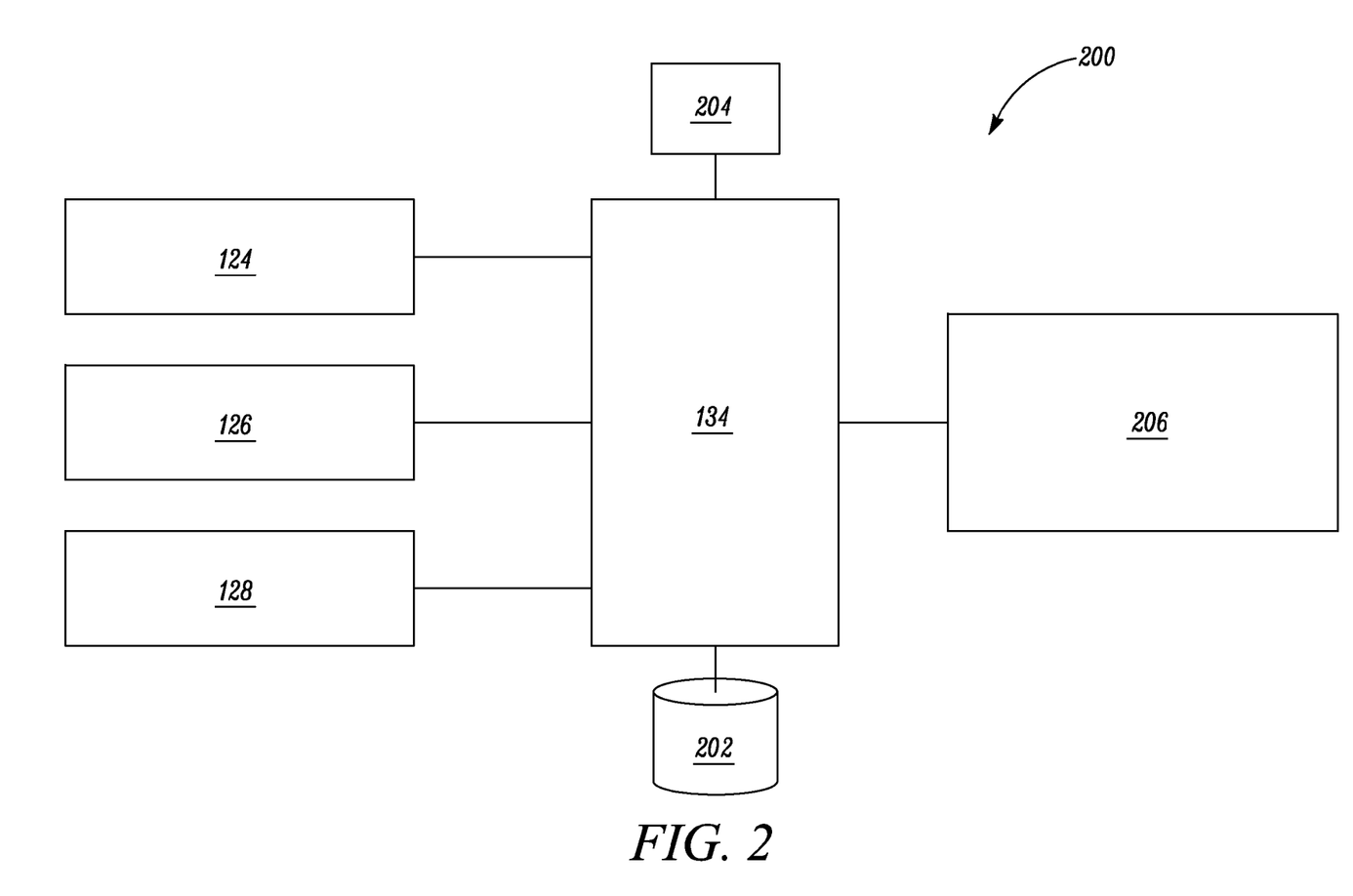
FIG. 2 is a block diagram of a system for determining an operational state of the machine shown in FIG. 1.

FIG. 2 illustrates a block diagram 200 of a system for determining the dig status of the machine 100. As shown, the implement position sensor 124 may be communicably coupled to the controller 134. Also, the pressure sensors 126, 128 may be communicably coupled to the controller 134. The controller 134 may be configured to receive the position signal from the implement position sensor 124. The controller 134 may also be configured to receive the pressure signals from the pressure sensors 126, 128.

Further, the controller 134 may be configured to determine a weight of the payload within the bucket 118 of the machine 100 based on the received signals. Accordingly, in one embodiment, the controller 134 may be communicably coupled to a database 202. The database 202 may be configured to store a pre-calibrated reference map. The reference map may contain readings of a pre-estimated weight of the payload for different combinations of the position of the implement 114 and the pressure associated with the cylinder 120. Accordingly, the controller 134 may be configured to retrieve at least a part of the readings stored in the database 202 and compare the received signals with the readings. Further, the controller 134 may determine the weight of the payload based on the comparison.

One of ordinary skill in the art will appreciate that the database 202 may be any conventional or non-conventional database known in the art, like an oracle-based database. Moreover, the database 202 may be capable of storing and/or modifying pre-stored data as per operational and design needs. In one embodiment, the database 202 may be extrinsic to the machine 100 and located at a remote location away from the machine 100. Alternatively, the database 202 may be intrinsic to the machine 100.

The controller 134 may also be configured to determine the dig status of the machine 100 based on a rate of change of the weight of the payload and the position of the implement 114. The change in the weight of the payload may be determined by finding a difference in the weight of the payload at a previous instance of time and the weight of the payload determined currently. Also, the change may signify a substantial increase in the weight or a decrease in the weight, as the case may be. The term "substantial" used herein refers to a fixed percentage of a target payload weight of the machine 100. This fixed percentage and the target payload weight may vary based on the type of the machine 100.

It should be understood that at a start of the dig operation, the substantial increase in the weight of the payload may be determined by the controller 134 over a certain time period. For example, when the bucket 118 enters into a pile, the increase in the weight of the payload may be determined by the controller 134. Thereafter, the weight of the payload may decrease when the bucket is pulled out of the pile which may also be determined by the controller 134.

In one embodiment, a timer module 204 may be optionally coupled to the controller 134. The timer module 204 may provide an input to the controller 134 in order to check if the change in the weight of the payload occurs within a given time period. More specifically, the timer module 204 may be configured to detect deviations from pre-fixed lower and upper timer limits based on known timeout features. The importance of monitoring if the change in the weight of the payload, more specifically the decrease in the weight of the payload, occurring within the lower and upper timer limits will be explained in detail in connection with FIG. 3. One of ordinary skill in the art will appreciate that functionality of the timer module 204 may alternatively be an additional functionality performed by the controller 134 itself.

In the illustrated embodiment, the controller 134 may be communicably coupled to a display device 206 present within the operator station 110 of the machine 100. The display device 206 may display a notification of the dig status of the machine 100. The display device 206 may include an LCD device, an LED device, a CRT monitor, a touchscreen device or any other known display device known in the art. The notification may be any suitable auditory and/or visual feedback provided to the operator, the feedback being indicative of a current dig status of the machine 100.

Figure 3:
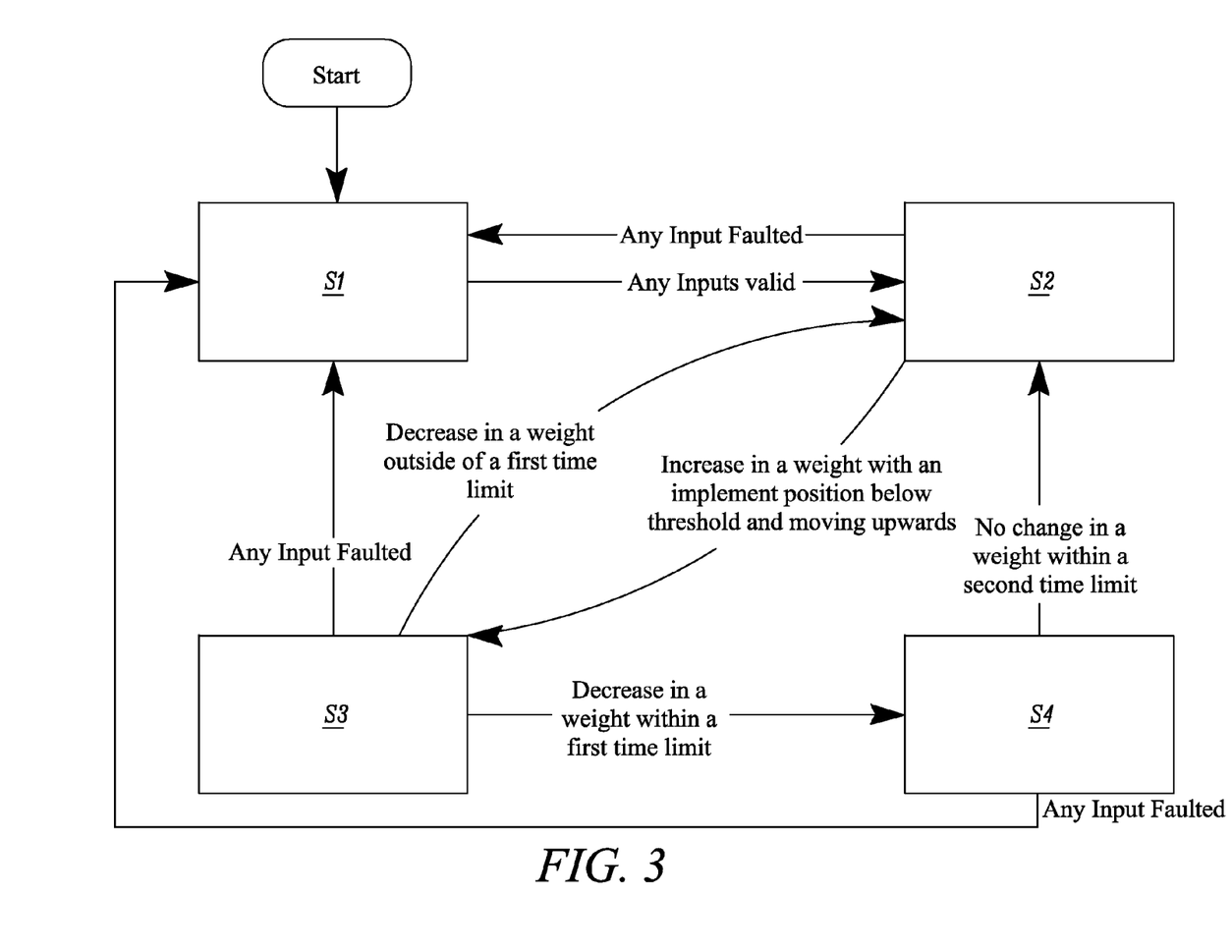
FIG. 3 is a state transition diagram depicting changes in the operational state of the machine.

The dig status determined by the controller 134 may include any one of four possible states. FIG. 3 is a state transition diagram 300 depicting the states and conditions on which transitioning from one state to another state may take place. A first state S1 corresponds to an unknown operation associated with the implement 114. A second state S2 corresponds to a dig operation not being performed by the implement 114. A third state S3 corresponds to a tentative dig operation being performed by the implement 114 and a fourth state S4 corresponds to the dig operation being performed by the implement 114.

Physically, these states are indicative of different stages of the dig operation. For example, the third state S3 may be reached at the start of the dig operation, when the bucket 118 of the machine 100 enters or is within the pile. The fourth state S4 may be reached when the bucket 118 is pulled out of the pile within the given time period associated with the dig operation. The second state S2 may be reached after the dig operation is completed and the weight of the payload in the bucket 114 is stabilized.

Referring to FIG. 3, the first state S1 may be identified as the dig status of the machine 100 by the controller 134 when the machine 100 is started. The controller 134 may then be configured to detect if a fault condition is associated with any of the received position and/or the received pressure signal.

The fault condition may be detected based on invalid or erroneous inputs received by the controller 134 due to a variety of reasons, such as, for example, hardware failure, short to battery, short to ground, sensor failure and the like. If the fault condition is identified, the dig status of the machine 100 may continue to remain in the first state S1. If the fault condition is not detected, the dig status may transition to the second state S2.

When the dig status of the machine 100 is in the second state S2, the controller 134 may be configured to detect the increase in the weight of the payload. More specifically, this increase in the weight of the payload may be determined when the increase in the weight exceeds a first fixed percentage of the target payload of the machine 100. As described earlier, the first fixed percentage may vary based on the type of the machine 100. For example, in case of the wheel loader 102, the first fixed percentage may be approximately at least 10% of the target payload of the wheel loader 102.

It should be noted that the increase in the weight of the payload may be indicative of the start of the dig operation. However, the increase in the weight of the payload may also occur when the implement 114 of the machine 100 freely moves downwards relative to the frame 122 of the machine 100. Such an event is unrelated to the dig operation and should not affect the dig status of the machine 100. Accordingly, if the increase in the weight is detected, the controller 134 may be configured to further compare the position of the implement 114 with a predetermined threshold. This predetermined threshold may refer to a start of weigh position which may include positional co-ordinates of a reference set above a position at which the dig operation may end.

Also, the controller 134 may be configured to determine a direction of movement of the implement 114. In one exemplary situation, a velocity of movement of the implement 114 may be determined. More specifically, if the implement 114 is determined to be stationary or moving in an upward direction relative to the frame 122 of the machine 100 and the position of the implement 114 is below the predetermined threshold, then the controller 134 may be configured to transition the dig status of the machine 100 from the second state S2 to the third state S3.

One of ordinary skill in the art will appreciate that once the start of the dig operation is detected, that is the dig status of the machine 100 is in the third state S3, there may be a subsequent decrease in the weight of the payload. The decrease in the weight of the payload may occur as excess material may fall out of the bucket 118 when the bucket 118 is pulled out of the pile. Accordingly, when the dig status of the machine 100 is in the third state S3, the controller 134 may be configured to detect a rate of the decrease in the weight of the payload. More specifically, the decrease in the weight of the payload may be detected when the weight of the payload may decrease by a second fixed percentage of the target payload of the machine 100. For example, in case of the wheel loader 102, the second percentage may be approximately at least 1% of the target payload of the wheel loader 102.

However, in an exemplary situation when the machine 100 may be moving on uneven or rocky terrain, the machine 100 may hit a bump. In this case, the controller 134 may detect the increase in the weight of the payload and also a relatively sharp or quick decrease in the weight of the payload. One of ordinary skill in the art will appreciate that the dig operation may last for a finite duration, the finite duration being relatively longer than that of the quick change in the weight of the payload in case of hitting the bump. This duration may be fixed and may vary based on the type of the machine 100. Accordingly, the controller 134 may be configured to monitor the time duration between the increase in the weight of the payload and the decrease in the weight of the payload or the rate of the decrease in the weight of the payload.

The controller 134 may be configured to transition the dig status of the machine 100 from the third state S3 to the fourth state S4 if the time duration falls within a first predetermined time limit. This may be indicative of the digging operation being performed by the implement 114. For example, for the wheel loader 102, the first predetermined time limit may be approximately between 0.5 and 45 seconds. This time limit may correspond to an amount of time required for the bucket 118 to enter and subsequently leave the pile.

Alternatively, if the time duration falls out of the first predetermined time limit, the controller 134 may be configured to transition the dig status of the machine 100 from the third state S3 to the second state S2. This may be indicative of the digging operation not being performed by the implement 114. For example, in one situation when the time duration is less than 0.5 seconds, the wheel loader 102 may have hit the bump. In another case, when the time duration is more than 45 seconds, the wheel loader 102 may be performing a task unrelated to the dig operation. As described above, the timer module 204 may be utilized to determine if the time duration lies within the first predetermined time limit or falls out of the first predetermined time limit.

When the digging operation is being performed by the implement 114, after a specified time duration, the digging operation may be completed. On the completion of the digging operation, the weight of the payload within the bucket 118 may be stabilized indicative of an end of the dig operation. Accordingly, when the dig status of the machine 100 is in the fourth state S4, the controller 134 may be configured to detect the rate of change in the weight of the payload by a third fixed percentage of the target payload of the machine 100. For the wheel loader 102, in one exemplary case, the third fixed percentage may be approximately at least 2.5% of the target payload of the wheel loader 102.

Further, the controller 134 may be configured to determine if the weight of the payload does not change within a second predetermined time limit. In case of the wheel loader 102 the second predetermined time limit may be approximately 2 seconds. The controller 134 may be configured to transition the dig status of the machine 100 from the fourth state S4 to the second state S2 when there is no change in the weight of the payload within the second predetermined time limit is detected.

It should be noted that no change in the weight of the payload within the second predetermined time limit may be indicative of the stabilization in the weight of the payload within the bucket 118 of the wheel loader 102. The controller 134 may either utilize the timer module 204 or another similar timer module to implement this time keeping functionality. Also, the controller 134 may be configured to transition the dig status of the machine 100 from any one of the second state S2, the third state S3 and the fourth state S4 to the first state S1 if the fault condition is detected.

Based on the dig status of the machine 100 determined by the controller 134, an output signal having a value indicative of any one of the four states S1, S2, S3, S4 may be issued by the controller 134. In one embodiment, the output signal may be provided to any other module or component present on the machine 100 requiring the current dig status as an input. In another embodiment, the operator may be notified of the current dig status of the machine 100.

The controller 134 may embody a single microprocessor or multiple microprocessors that may include a means for receiving signals from the implement position sensor 124 and the pressure sensors 126, 128. Numerous commercially available microprocessors may be configured to perform the functions of the controller 134. It should be appreciated that the controller 134 may readily embody a general machine microprocessor capable of controlling numerous machine functions. A person of ordinary skill in the art will appreciate that the controller 134 may additionally include other components and may also perform other functionality not described herein. It should be understood that the embodiments and the connections explained herein are merely on an exemplary basis and do not limit the scope and spirit of the disclosure.

A method 400 for determining the operational state of the machine 100 will be described in connection with FIG. 4.

INDUSTRIAL APPLICABILITY

Known dig detection systems may be unable to accurately record all the dig operations performed by the machine. Typically, unconventional dig operations performed by less experienced operators may not be captured by these systems. Unreliable dig detection may affect overall machine productivity data.

In the present disclosure, as described above, the controller may be configured to monitor real time instantaneous changes in the weight of the payload for determining the current dig status of the machine. The system may provide relatively accurate detection of the dig operation, regardless of the operating style of the operator. Further, the system may enable payload and performance monitoring in order to accurately perform operation weight calculations and operation segmentation calculations based on the detection. Moreover, the system may make use of super step semantics, wherein the dig status of the machine may transition through multiple states in one execution until the current dig status of the machine may be reached.

Figure 4:
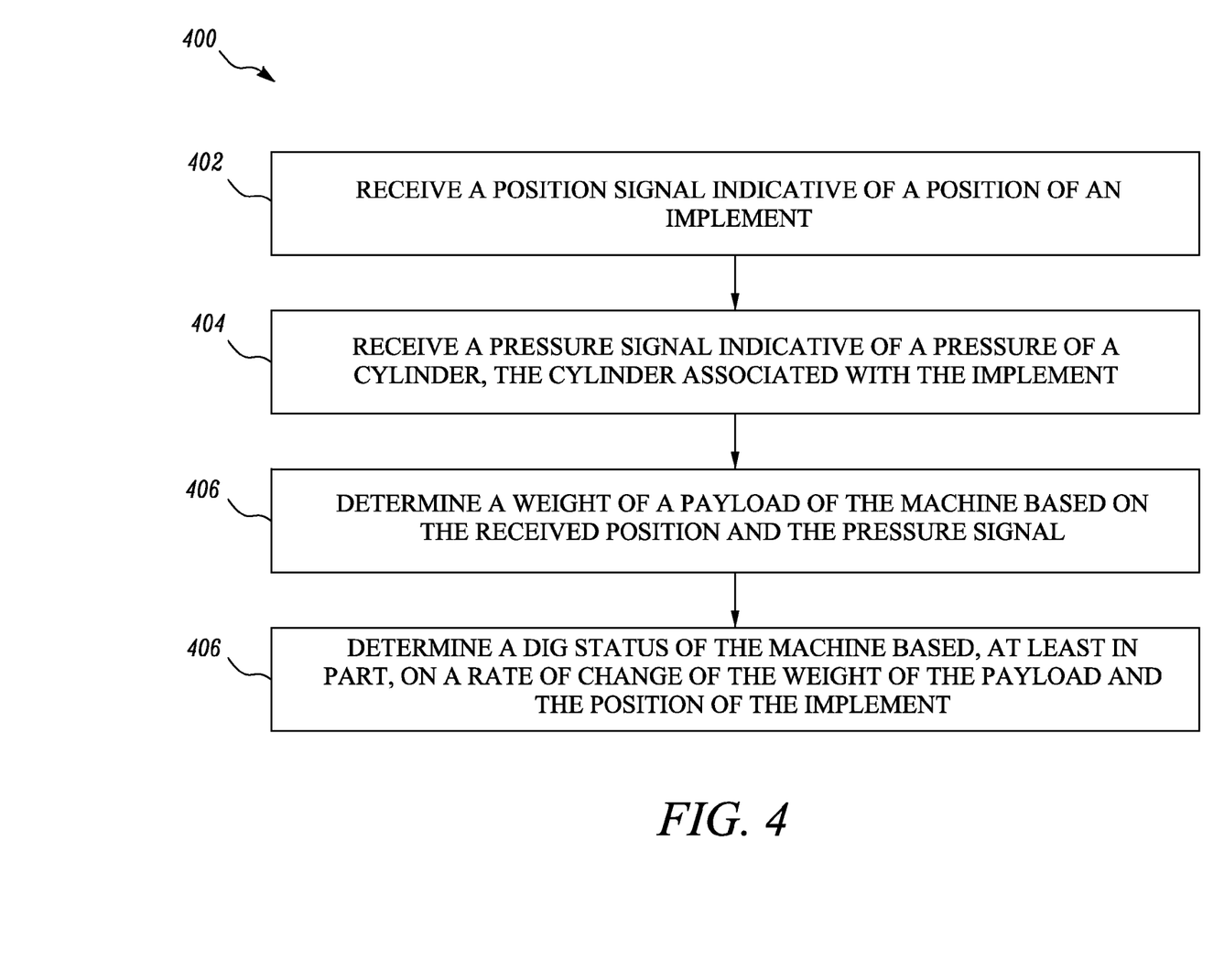
FIG. 4 is a flowchart for determining the operational state of the machine.

FIG. 4 illustrates the method 400 for determining the operational state of the machine 100. At step 402, the position signal indicative of the position of the implement 114 may be received by the controller 134. At step 404, the pressure signal indicative of the pressure of the cylinder 120 may be received by the controller 134.

At step 406, the controller 134 may determine the weight of the payload of the machine 100 based on the received position and the pressure signal. In one embodiment, the controller 134 may access and retrieve the pre-calibrated reference map stored in the database 202. The controller 134 may compare the received signals with the reference map, in order to determine the weight of the payload.

At step 408, the dig status of the machine 100 may be determined based on the rate of change of the weight of the payload and the position of the implement 114. As described earlier, the dig status of the machine 100 may be any one of the four states S1, S2, S3, S4. The output of the controller 134 may be indicative of the current dig status of the machine 100.

It should be noted that the disclosure may be utilized in wheel loader applications during the dig operation of any material in order to start recording cycle productivity data and/or during tip-off mode operations. It should be noted that although the disclosure described herein is with reference to the wheel loader 102, the disclosure may find application on other types of machines such as, for example, an excavator or any other machine capable of providing or accepting payloads during a dig cycle.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A system for determining an operational state of a machine, the system comprising:
   an implement position sensor configured to generate a position signal indicative of a position of an implement;
   a pressure sensor associated with a cylinder, the cylinder coupled to the implement, the pressure sensor configured to generate a pressure signal indicative of a pressure of the cylinder; and
   a controller is communicably coupled to the implement position sensor and the pressure sensor, the controller configured to:
      receive the position signal indicative of the position of the implement;
      receive the pressure signal indicative of the pressure of the cylinder;
      determine a weight of a payload of the machine based on the received position and the pressure signal;
      determine a dig status of the machine based, at least in part, on a rate of change of the weight of the payload and the position of the implement, wherein the dig status comprises any one of: a first state corresponding to an unknown operation associated with the implement, and a second state corresponding to a dig operation not being performed by the implement;
      identify the first state as the dig status of the machine;
      detect if a fault condition is associated with at least one of the received position signal and the pressure signal; and
      transition the dig status of the machine from the first state to the second state if the fault condition is not detected.

2. The system of claim 1, wherein two pressure sensors are provided at a rod end and a head end of the cylinder respectively.

3. The system of claim 1, wherein the controller is further configured to compare the received position and the pressure signal with a pre-calibrated reference map to determine the weight of the payload.

4. The system of claim 1, wherein the dig status further comprises any one of:
   a third state corresponding to a tentative dig operation being performed by the implement; and
   a fourth state corresponding to the dig operation being performed by the implement.

5. The system of claim 4, wherein when the dig status of the machine is in the second state the controller is further configured to:
   detect an increase in the weight of the payload by a first fixed percentage of a target payload of the machine;
   compare the position of the implement with a predetermined threshold based on the detection of the increase in the weight of the payload;
   determine a direction of movement of the implement relative to the machine based on the detection of the increase in the weight of the payload; and
   transition the dig status of the machine from the second state to the third state based on the comparison and the determination.

6. The system of claim 5, wherein when the dig status of the machine is in the third state the controller is further configured to:

detect a rate of decrease in the weight of the payload by a second fixed percentage of the target payload of the machine; and transition the dig status of the machine from the third state to any one of:

the fourth state if the rate of the decrease in the weight of the payload occurs within a first predetermined time limit; and the second state if the rate of the decrease in the weight of the payload occurs outside of the first predetermined time limit.

7. The system of claim 6, wherein when the dig status of the machine is in the fourth state the controller is further configured to:

detect the rate of change in the weight of the payload by a third fixed percentage of the target payload of the machine;

detect if the weight of the payload does not change within a second predetermined time limit; and transition the dig status of the machine from the fourth state to the second state based on the detection of the rate of change within the second predetermined time limit.

8. The system of claim 7, wherein the controller is further configured to transition the dig status of the machine to the first state from any one of the second state, the third state and the fourth state based on the fault condition.

9. The system of claim 1 further comprising a display device communicably coupled to the controller.

10. The system of claim 9, wherein the controller is further configured to display a notification of the dig status of the machine on the display device.

11. A method for determining an operational state of a machine, the method comprising:

receiving a position signal indicative of a position of an implement;

receiving a pressure signal indicative of a pressure of a cylinder, the cylinder associated with the implement;

determining a weight of a payload of the machine based on the received position and the pressure signal;

determining a dig status of the machine based, at least in part, on a rate of change of the weight of the payload and the position of the implement, wherein the dig status comprises any one of: a first state corresponding to an unknown operation associated with the implement, and a second state corresponding to a dig operation not being performed by the implement;

identifying the first state as the dig status of the machine;

detecting if a fault condition is associated with at least one of the received position signal and the pressure signal; and transitioning the dig status of the machine from the first state to the second state if the fault condition is not detected.

12. The method of claim 11 further comprising comparing the received position and the pressure signal with a pre-calibrated reference map to determine the weight of the payload.

13. The method of claim 11, wherein the dig status further comprises any one of:

a third state corresponding to a tentative dig operation being performed by the implement; and a fourth state corresponding to the dig operation being performed by the implement.

14. The method of claim 13 further comprising:

detecting an increase in the weight of the payload by a first fixed percentage of a target payload of the machine;

comparing the position of the implement with a predetermined threshold based on the detection of the increase in the weight of the payload;

determining a direction of movement of the implement relative to the machine based on the detection of the increase in the weight of the payload; and transitioning the dig status of the machine from the second state to the third state based on the comparison and the determination.

15. The method of claim 14 further comprising:

detecting a rate of decrease in the weight of the payload by a second fixed percentage of the target payload of the machine; and transitioning the dig status of the machine from the third state to any one of:

the fourth state if the rate of the decrease in the weight of the payload occurs within a first predetermined time limit; and the second state if the rate of the decrease in the weight of the payload occurs outside of the first predetermined time limit.

16. The method of claim 15 further comprising:

detecting the rate of change in the weight of the payload by a third fixed percentage of the target payload of the machine;

detecting if the weight does not change within a second predetermined time limit; and transitioning the dig status of the machine from the fourth state to the second state based on the detection of the rate of change within the second predetermined time limit.

17. The method of claim 16 further comprising transitioning the dig status of the machine to the first state from any one of the second state, the third state and the fourth state based on the fault condition.

18. The method of claim 11 further comprising displaying a notification of the dig status of the machine.

19. The system of claim 6, further comprising a timer module associated with the controller, the timer module configured to detect deviations from pre-fixed lower and upper timer limits.

20. The system of claim 10, wherein the display device includes any one of an LCD device, an LED device, a CRT monitor, and a touchscreen device.

* * * * *